US009643135B1

(12) United States Patent
Mazzei et al.

(10) Patent No.: US 9,643,135 B1
(45) Date of Patent: May 9, 2017

(54) PROPORTIONATE AUTOMATED BLENDING SYSTEM FOR AQUEOUS MIXTURES

(71) Applicant: Mazzei Injector Company, LLC, Bakersfield, CA (US)

(72) Inventors: Angelo L. Mazzei, Bakersfield, CA (US); Celia Marie Cobar, Bakersfield, CA (US); Kenneth Cobar, Bakersfield, CA (US)

(73) Assignee: MAZZEI INJECTOR COMPANY, LLC, Bakersfield, CA (US)

( * ) Notice: Subject to any disclaimer, the term of this patent is extended or adjusted under 35 U.S.C. 154(b) by 0 days.

(21) Appl. No.: 15/353,504

(22) Filed: Nov. 16, 2016

Related U.S. Application Data

(62) Division of application No. 15/207,909, filed on Jul. 12, 2016.

(51) Int. Cl.
*B01F 3/08* (2006.01)
(52) U.S. Cl.
CPC ................... *B01F 3/0865* (2013.01)
(58) Field of Classification Search
CPC .................................................... B01F 3/0865
USPC .......................................... 366/138; 251/209
See application file for complete search history.

(56) References Cited

U.S. PATENT DOCUMENTS

| 3,424,439 | A | | 1/1969 | Baker | |
|---|---|---|---|---|---|
| 3,563,511 | A | * | 2/1971 | Bentley-Leek | ........... F16K 5/12 251/209 |
| 3,880,191 | A | * | 4/1975 | Baumann | .............. F16K 47/045 137/625.32 |
| 5,551,467 | A | * | 9/1996 | Booth | ................... F16K 5/0605 137/1 |
| 5,827,959 | A | | 10/1998 | Clanin | |
| 5,863,128 | A | | 1/1999 | Mazzei | |
| 5,937,890 | A | * | 8/1999 | Marandi | ............... F16K 5/0605 137/271 |
| RE39,658 | E | * | 5/2007 | Carlson | ........................ 251/118 |
| 7,766,883 | B2 | | 8/2010 | Reilly et al. | |
| 7,776,275 | B2 | | 8/2010 | Whitmore, Sr. | |
| 2002/0170853 | A1 | | 11/2002 | Alexander | |
| 2009/0263313 | A1 | | 10/2009 | Martens et al. | |

* cited by examiner

*Primary Examiner* — Abbas Rashid
(74) *Attorney, Agent, or Firm* — James M. Duncan, Esq.; Klein DeNatale Goldner

(57) ABSTRACT

A proportionate automated blending system for aqueous mixtures has a plurality of liquid additive control modules which each provide a desired amount of additive to a dedicated mixing injector to blend each additive with water to provide a precise mixture of additive and water. The system has the capability, in between blending cycles, of purging the components of the additive control modules with air and water to displace any residue additive which may remain in the control module. The system is controlled by a controller which controls an actuated control valve to achieve the desired flow rate of liquid additive to acquire the desired proportion of liquid additive to water.

5 Claims, 4 Drawing Sheets

PROPORTIONATE AUTOMATED BLENDING SYSTEM FOR AQUEOUS MIXTURES

RELATED APPLICATIONS

This is a divisional application of U.S. application Ser. No. 15/207,909, filed on Jul. 12, 2016, to which application the Inventors and Applicant herein claim domestic priority.

BACKGROUND OF THE INVENTION

The present invention generally relates to automated liquid blending systems, and more specifically to automated systems which precisely blend a liquid additive with water as a base liquid to yield a mixture having a precise proportion of the liquid additive to water. One application of the presently described automated blending system is to provide a precise blend of fertilizers, nutrients, and other additives which are applied to crop through the irrigation system. However, other applications for acquiring precisely blended aqueous mixtures are readily apparent.

The use of automated metering systems to mix one or more liquids with water to provide a precise liquid mixture has significant advantage, specifically where the liquid mixture is thereafter utilized in scheduled release. For example, it would be desirable to have such a system for blending liquid nutrients into irrigation water to provide an efficient and cost effective tool for providing nutrition to crops. It is to be appreciated that the expense of nutrients for large scale farming operations can be significant, thereby meriting precision application of these substances. Moreover, it is desirable to obtain the optimum application program, including the application volume, rate, and timing, to maximize crop quality and yield. It is also desirable to create a record of the nutrient program which may be utilized in the future for forecasting future nutrient requirements and maximizing the effectiveness and cost efficiency of future nutrient programs.

It is would also be desirable to have an automated liquid blending system which includes a cleaning cycle which positively displaces the liquid additive from the valving, controls and mixing apparatus. When the blending cycle has been completed, certain liquid additives can solidify or gum up inside the various components of the blending system, or evaporate inside the components leaving a precipitate or residue which might later cause problems with the system. An automated liquid blending system which includes hardware and controls which positively displaces the liquid additive from the system components would prevent problems which may otherwise result from residue left in the components.

SUMMARY OF THE INVENTION

Embodiments of the presently disclosed invention provide a precisely proportioned liquid mixture which is blended automatically. Embodiments of the present system may have a plurality of reservoirs for liquid additives which are blended with water as a base liquid. Each liquid additive is stored within a liquid additive storage vessel, which may have level indicators which provide output to a controller for monitoring liquid level status for each storage vessel. Each liquid additive has a dedicated control module for that particular additive.

The control module may include an electromechanical valve on each storage vessel which allows the release of a particular additive into the system, a flow meter which measures the volume of additive which passes through the control module, and a modulating electromechanical valve that controls the flow of additive from the storage vessel into a liquid additive inlet for mixing injector. The control module may also have a purge water intake valve and an air intake valve which allow the sequential flow of water and air through the control module, and out the mixing injector for purging any additive residue from the control module and out the mixing injector.

The mixing injector of the system is a venturi type injector which has a water inlet, a liquid additive inlet, and a mixed liquid discharge.

In controlling the flow of liquid additive from the control module into the liquid additive inlet of the mixing injector, the actuated control valve receives instructions from a controller such that the control valve provides a flow rate of liquid additive into the mixing injector which, when blended with water from the water inlet, yields a mixed liquid having a precise proportion of additive to water.

With respect to the blending of fertilizers, nutrients and other additives with irrigation water, embodiments of the present invention provide a precisely proportioned mixture of fertilizer and/or nutrients with irrigation water for application to a crop during an irrigation cycle. Such fertilizers may include nitrogen, phosphorous, potassium, micronutrients (specifically boron, chlorine, copper, iron, manganese, molybdenum, nickel and zinc) and other known liquid nutrients. Other additives might include herbicides, insecticides and other pesticides. The precise application of these fertilizers, nutrients, herbicides, insecticides and other pesticides to a crop can optimize crop yields and reduce waste of nutrients. Embodiments of the disclosed invention maintain a history of nutrient and water usage, including specifics regarding the application which may be utilized for forecasting future nutrient requirements.

Upon the completion of the application of the mixed liquid (e.g., upon completion of an irrigation cycle for crops) the additive lines are purged with both water and air to clear leftover additive from the components of the additive control module and the mixing injector.

Embodiments of the presently disclosed apparatus may utilize a touch screen interface with local (WiFi) and long distance (satellite) remote access. Embodiments of the system may mix up a plurality of different chemicals, where each chemical may be controlled by an identical liquid additive control module. Each liquid additive control module may be made up of a variety of controls and sensing units, and may include an air intake valve, a chemical intake valve, a servo-actuator valve analog control line, a servo-actuator valve analog feedback, a magnetic flow meter, and a chemical level indicator. The air intake, chemical intake and purge water intake valves are typically operated by relay at 12-24 VDC @ 0.9 W. The servo-actuator valve analog control line typically has a 4-20 mA analog output. The servo-actuator valve analog feedback typically has a 4-20 mA analog input. The magnetic flow meter may have a 4-20 mA analog input. The chemical level indicator may be a SPDT switch.

The system control requires both analog and digital outputs and inputs. The system itself may have a variety of sensing and monitoring devices, including a boost pressure sensor, a mainline pressure sensor, a paddlewheel flow monitor, a pump starter, a pump overload, a variety of alarms, halts, shutdowns and valve selector sensors. The pressure sensors may have a 4-20 mA analog output, while the alarms and auxiliary controls may be operated by relay at 12-24 VDC @ 0.9 W. The paddlewheel monitor may be an open collector type operated at 5-24 VDC. The shutdowns may be a SPDT switch.

Using liquid nitrogen fertilizer as a specific example, an embodiment of the system may have a control valve for controlling the release of the liquid nitrogen, a control valve for controlling the flow of purge air into the nitrogen-related piping, a water control line for controlling the flow of purge water into the nitrogen-related piping, a low level sensor on the liquid nitrogen reservoir, an operating level sensor on the nitrogen reservoir, an actuator position controller, an actuator position sensor, and a magnetic flow meter. Similar controls and sensors may be applied to the other individual liquid additive reservoirs provided in the system.

In one embodiment, the system requires 24 valve selector sensors, 10 chemical level sensors (duals), 1 reset sensor, 1 system flow rate sensor, and 1 pump overload sensor. An embodiment of the system may further comprise digital controllers providing output for chemical (5 total), water (5 total), and air (5 total), and a total of 5 digital controllers providing output for pump, alarm, shutdown, Aux1 and Aux2. An embodiment of the system may further comprise pressure sensors (2) for water intake and blended solution outtake, chemical flow monitors (5), chemical flow control feedback (5) and chemical flow controls (5).

The modulating valves may be ball valves manufactured by Plast-O-Matic Valves, where the modulator has 160 steps, a 4-20 MA input, with 2% hysteresis. In order to achieve a proportionate response between the liquid additive flow rate through the control valve and the modulating valve, a particular configuration of internal ball may be utilized in the modulating ball valve. The modulating valve may have an internal ball which controls the flow of liquid additive into the liquid additive inlet. The internal ball may comprise an inlet side and an outlet side, where a flow channel extends from a flow entry on the inlet side to a flow exit on the outlet side. The flow channel expands as it extends through the internal ball from the flow entry to the flow exit. The flow entry may comprise a triangular opening on one side which transitions across the side of the ball into an oblong slit. The flow exit may comprise an oblong oval on the outlet side.

DETAILED DESCRIPTION OF THE INVENTION

Figure 1:
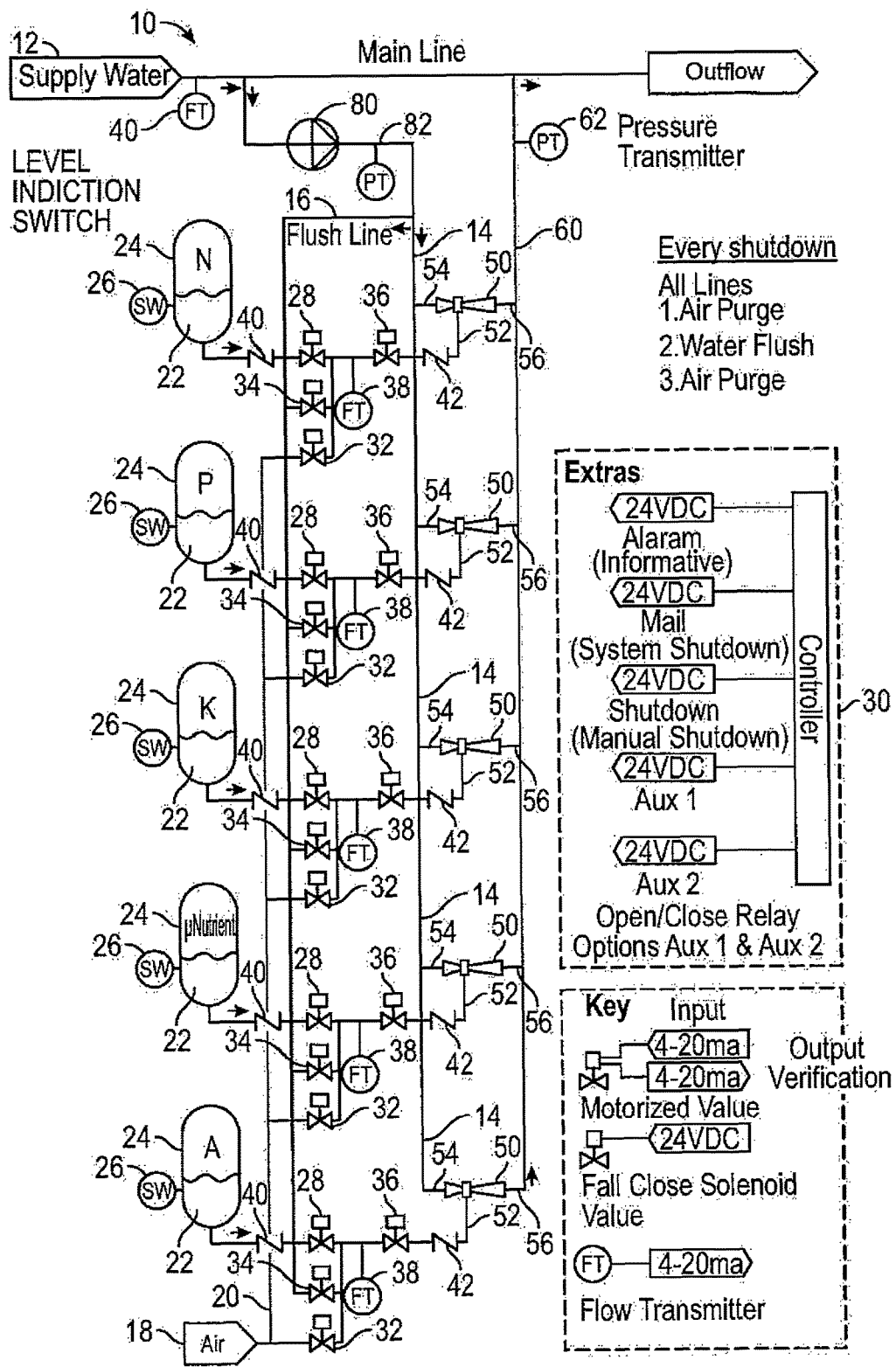
FIG. 1 shows a process and flow diagram for an embodiment of the present invention.

Referring now to the figures, FIG. 1 depicts shows a process and flow diagram for an embodiment of the present proportionate automated blending system for aqueous mixtures 10. The system 10 has a water supply 12 which supplies water to a mixing line 14 and to a flush line 16 through pump 80. Total water provided through the water supply 12 may be measured by flow meter 40, which may have a flow rate range of 0.3 to 20 ft/s with an open collector output that outputs 15 Hz per ft/s for an output of 4.5 to 300 Hz, with the output directed to controller 30. The system also has an air inlet 18 which is attached to an air purge line 20.

Liquid additives 22, such as nitrogen, phosphorous, potassium and micronutrients, are stored within liquid additive storage vessels 24. Storage vessels 24 may have level indication switches 26 which may provide output to controller 30 which may report a real time liquid level inside each liquid additive storage vessel 24 and track liquid additive usage. Liquid additives 22 may be propelled through the system 10 by one or more pumps (not shown). Liquid additive 22 enters into a liquid additive control module through additive intake valve 28. The unit referred to as the "liquid additive control module" may comprise the additive intake valve 28, an air intake valve 32, a water intake valve 34, an actuated control valve 36 and a flow meter 38. The liquid additive control module is isolated from flow back into liquid additive storage vessels 24 by check valve 40. Additive intake valve 28, air intake valve 32 and water intake valve 34 may be fail close solenoid valves operating on 24 VDC. Actuated control valve 36 may be motor actuated utilizing 4-20 ma analog input and a 4-20 ma analog output verification. The inventors herein have found that the actuate control valve 36 may be ball valves manufactured by Plast-O-Matic Valves, where the actuator has 160 steps, a 4-20 MA input, with 2% hysteresis, which may utilize a modified ball 100 as shown in FIGS. 5-8 and as discussed below.

A mixing injector 50 receives liquid additive 22 through liquid additive inlet 52, with the liquid additive passing through a check valve 42. Mixing injector 50 receives water through water inlet 54 which is connected to mixing line 14. Mixing injector 50 is a venturi injector such as that manufactured by Mazzei Injector Company of Bakersfield, Calif. and as described in U.S. Pat. No. 5,863,128 by A. Mazzei, an inventor herein. Water and liquid additive 22 are mixed inside the mixing injector 50 resulting in a mixed liquid which flows out of the mixed liquid discharge 56. A plurality of mixer injectors 50 may be utilized in a system 10, where each mixed liquid discharge 56 is tied into a family line 60. Family line 60 may have a pressure transmitter 62 for measuring and outputting the observed pressure in the line to the processor 30. Family line 60 may thereafter distribute the mixed liquid as required for irrigation or other purpose. Pressure transmitter 82 downstream of pump 80 provides output of boost pressure to the controller 30.

Figure 2:
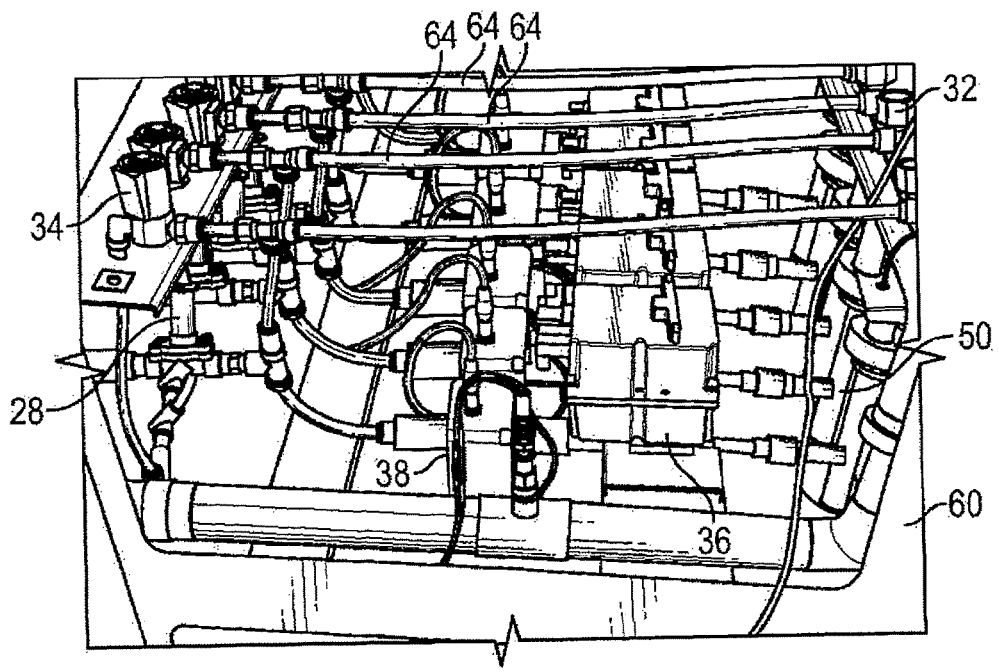
FIG. 2 depicts a plurality of liquid additive control modules may be assembled for utilization in an embodiment of the present invention.
Figure 3:
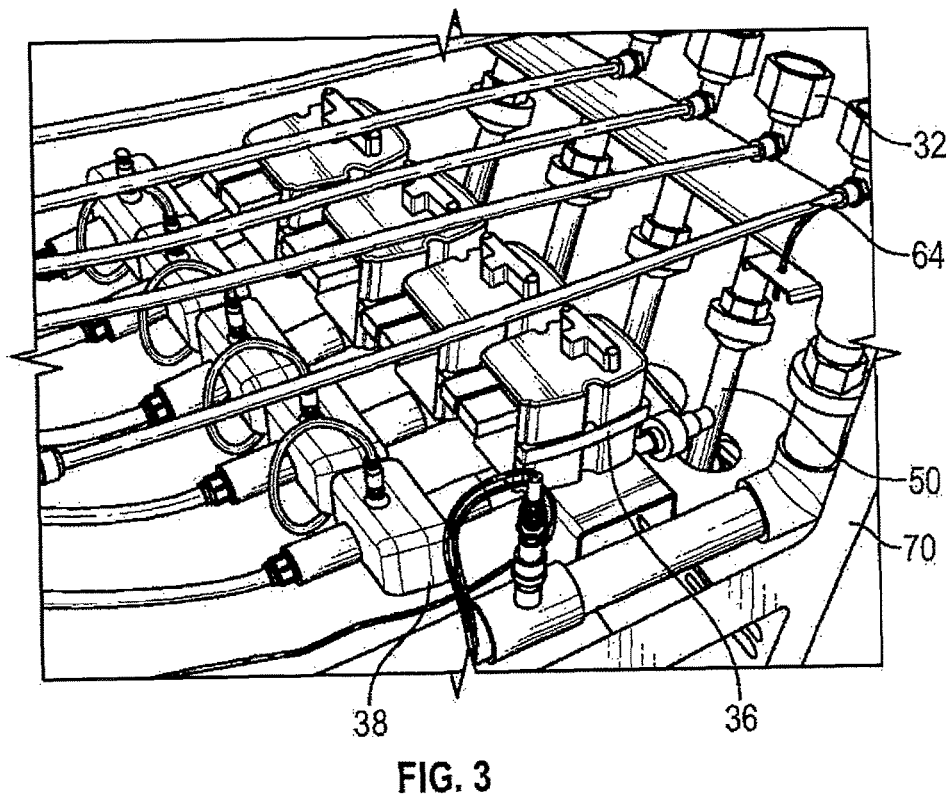
FIG. 3 depicts a plurality of liquid additive control modules may be assembled for utilization in an embodiment of the present invention.

FIGS. 2-3 show a plurality of liquid additive control modules assembled within a cabinet 70. Each control module comprises an additive intake valve 28, an air intake valve 32, an water intake valve 34, an flow meter 38 and an actuated control valve 36. Each actuated control valve 36 is connected to a mixing injector 50. The components of each liquid additive control module are hydraulically connected together by interconnecting piping 64.

Figure 4:
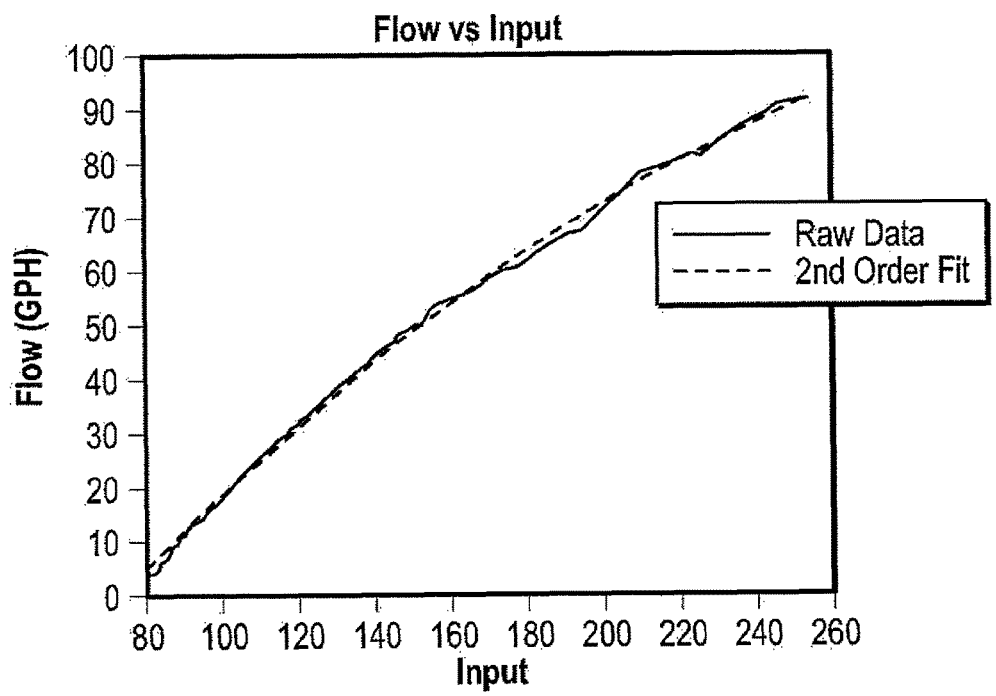
FIG. 4 depicts a plot of flow rate vs. actuator position for an embodiment of an actuated ball valve utilized to deliver a liquid additive to a mixing injector in the present invention.
Figure 5:
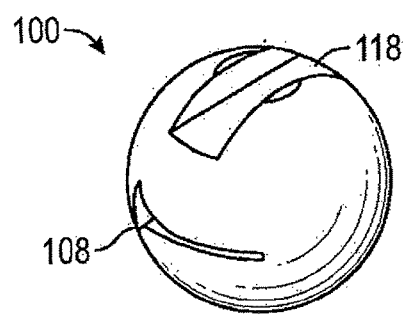
FIG. 5 depicts an isometric view of an embodiment of a ball which may be utilized in a flow control valve of the present invention.
Figure 6:
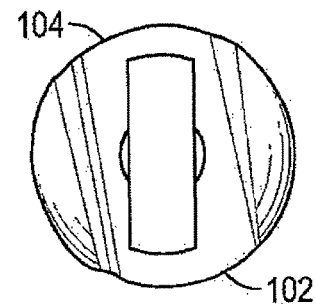
FIG. 6 shows a top view of the ball of FIG. 5.
Figure 7:
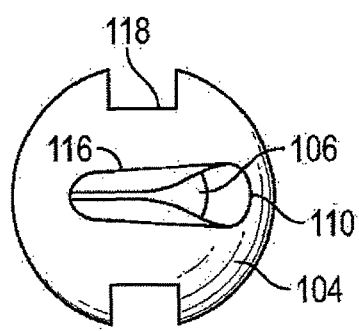
FIG. 7 shows an end view of the ball of FIG. 5.
Figure 8:
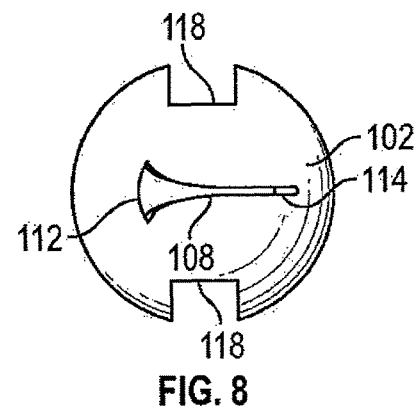
FIG. 8 shows a front view of the ball of FIG. 5.

FIG. 4 depict a plot of flow rate vs. servo-actuator input value showing that the actuator with the particular ball described herein provides relatively linear performance. The actual flow tracks with a $2^{nd}$ order polynomial utilizing the equation:

$$\text{flow} = C_1(-0.0012x^2 = 0.9x) + C_o$$

where:

$$x = C_2(-0.0092\text{flow}^2 + 1.0414\text{flow}) = C^3$$

where the constants are variances from system to system

FIGS. 5-8 depict a ball 100 which may be utilized in actuated control valve 36 to provide the performance illustrated in the plot of FIG. 4. As shown in the figures, the ball 100 may have an inlet side 102 and an outlet side 104. A flow channel 106 extends from a flow entry 108 on the inlet side to a flow exit 110 on the outlet side 104. As shown in the figures, the flow channel 106 expands as it extends through the ball 100 from the flow entry 108 to the flow exit 110. As further shown in the figures, the flow entry 108 may comprise an triangular opening 112 which transitions into an oblong slit 114 as the flow entry spans across the inlet side 102 of the ball 100. The flow exit 110 may comprise an oblong oval 116 which spans across the outlet side 104. Ball 100 further comprises an actuator slot 118 for engagement by an actuator.

Figure 9:
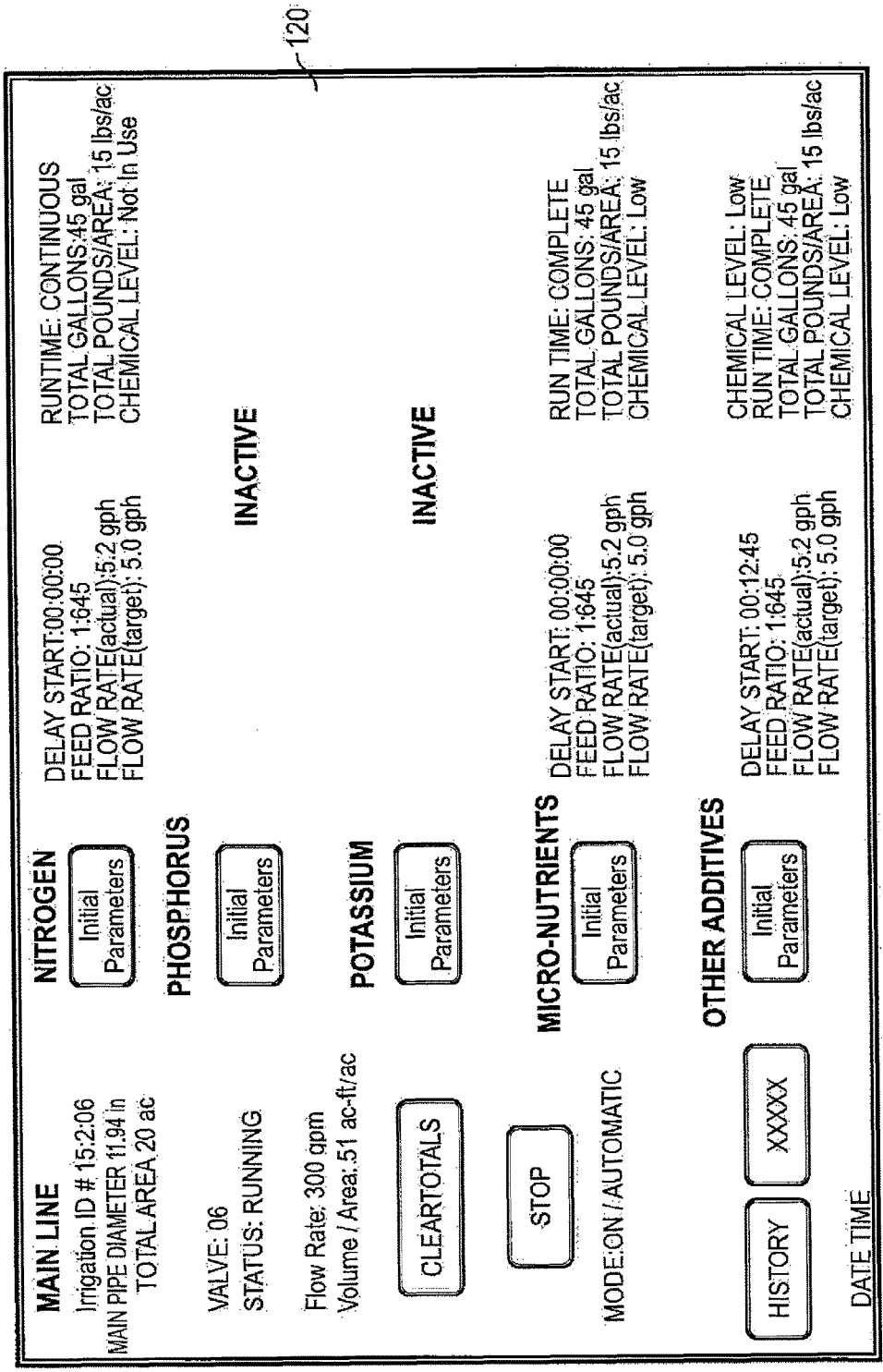
FIG. 9 depicts a summary window of a touch screen interface which may be used with embodiments of the present invention utilized in providing a precise dosage of nutrients through an irrigation system.

FIG. 9 depicts a touch screen interface 120 which may be utilized in combination with processor 30 for embodiments of the proportionate automated blending system 10 which is specifically utilized for mixing fertilizer and nutrients for application to crops with irrigation water. As suggested by FIG. 9, the processor of the system 10 may be utilized to actively manage, monitor and record the application of the various nutrients to a crop.

Having thus described the preferred embodiment of the invention, what is claimed as new and desired to be protected by Letters Patent includes the following:

1. A proportionate blending system comprising:
   a water supply system which selectively supplies water to a main line and a mixing line;
   a liquid additive storage vessel;
   a liquid additive intake valve;
   a mixing injector having a water inlet, a liquid additive inlet, and a mixed liquid discharge, wherein the mixing line provides water to the water inlet and the liquid additive storage vessel provides a liquid additive to the liquid additive inlet through the liquid additive intake valve, wherein the water and liquid additive are mixed inside the mixing injector resulting in a mixed liquid which flows out of the mixed liquid discharge at a predetermined ratio of liquid additive to water;
   a control valve having an actuator and an internal ball wherein the control valve controls a flow of liquid additive into the liquid additive inlet, the control valve providing a flow rate of liquid additive into the liquid additive inlet at a desired proportion of liquid additive to water, wherein the internal ball comprises an inlet side and an outlet side, wherein a flow channel extends from a flow entry on the inlet side to a flow exit on the outlet side, wherein the flow channel expands as it extends through the internal ball from the flow entry to the flow exit, wherein the flow entry comprises a triangular opening transitioning into an oblong slit and the flow exit comprises an oblong oval on the outlet side; and
   a controller which controls the control valve to achieve a desired flow rate of liquid additive into the liquid additive inlet to achieve the desired proportion of liquid additive to water, and a water purge line having a water intake valve which opens and closes upon receiving instructions from the controller, such that upon receiving the instructions from the controller a volume of water is released through the control valve, through the liquid additive inlet and out the mixed liquid discharge to purge any remaining liquid additive from the control valve and the mixing injector.

2. The proportionate blending system of claim 1 further comprising an air purge line having an air intake valve which opens and closes upon receiving instructions from the controller, such that upon receiving instructions from the controller a volume of air is released through the control valve, through the liquid additive inlet and out the mixed liquid discharge to purge any remaining liquid additive from the control valve and the mixing injector.

3. The proportionate blending system of claim 2 wherein the air intake valve and the water intake valve sequentially open and close upon receiving instructions from the controller, such that a first volume of air, followed by a first volume of water, followed by a second volume of air are released in sequence through the control valve, through the liquid additive inlet and out the mixed liquid discharge to purge any remaining liquid additive from the control valve and the mixing injector.

4. The proportionate blending system of claim 1 wherein the liquid additive comprises a nutrient for crops wherein the nutrient is at least one of the nutrients selected from the group consisting of nitrogen, phosphorous, potassium, micronutrients, herbicides, insecticides and pesticides.

5. The proportionate blending system of claim 1 further comprising a flow meter which measures a flow rate of the liquid additive provided to the liquid additive inlet, wherein the flow meter provides output to the controller reporting the flow rate for a particular time.

* * * * *